United States Patent
Kennedy et al.

(10) Patent No.: US 7,523,502 B1
(45) Date of Patent: Apr. 21, 2009

(54) DISTRIBUTED ANTI-MALWARE

(75) Inventors: Mark Kennedy, Redondo Beach, CA (US); Peter Szor, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 266 days.

(21) Appl. No.: 11/533,942

(22) Filed: Sep. 21, 2006

(51) Int. Cl.
*G06F 12/14* (2006.01)
*G06F 11/00* (2006.01)

(52) U.S. Cl. .................. 726/24; 726/22; 726/23; 726/25; 713/100; 709/201; 709/217

(58) Field of Classification Search .......... 726/24
See application file for complete search history.

(56) References Cited

U.S. PATENT DOCUMENTS

| | | | |
|---|---|---|---|
| 5,960,170 A * | 9/1999 | Chen et al. | 714/38 |
| 6,195,587 B1 | 2/2001 | Hruska et al. | |
| 6,560,632 B1 * | 5/2003 | Chess et al. | 709/201 |
| 2006/0075501 A1 * | 4/2006 | Thomas et al. | 726/24 |
| 2007/0016953 A1 * | 1/2007 | Morris et al. | 726/24 |

OTHER PUBLICATIONS

Phifer, L., 'Dealing with Adware and Spyware', Business Communications Review, Aug. 2006, pp. 44-51, http://www.corecom.com/external/bcrmag-spyware-aug06.pdf.*

* cited by examiner

*Primary Examiner*—Kambiz Zand
*Assistant Examiner*—Ronald Baum
(74) *Attorney, Agent, or Firm*—Fenwick & West LLP

(57) ABSTRACT

A technique for protecting a computer system against malware involves distributing anti-malware data across multiple computing resources. When a local machine detects a malware instance, the local machine may then query a network resource for anti-malware data needed to at least one of identify and remediate the malware instance. The malware instance is then remediated using the anti-malware data from the network resource.

17 Claims, 4 Drawing Sheets

DISTRIBUTED ANTI-MALWARE

BACKGROUND

As the Internet continues to expand in terms of both connectivity and number of users, the amount of malicious software ("malware") existing across the Internet continues to increase at a significant rate. Malware, in the form of, for example, viruses, Trojan horses, spyware, backdoor viruses, and worms, is essentially software code written to infiltrate and/or damage a computer system. In general, such malware spreads across computer systems via e-mail and file downloads over the Internet. In some worst case scenarios, malware can destroy important data, render a computer system virtually useless, and/or bring down a network of hundreds or thousands of computer systems. Recovering a computer system or network from a successful malware attack often requires considerable resources. Further, malware, while typically attacking computer systems connected to the Internet, can also spread from one computer system to the other by, for example, a non-Internet based file transfer between computer systems.

In an effort to protect computer systems against malware, various companies design and offer anti-malware programs (e.g., Norton Antivirus™ by Symantec Corporation). Generally, anti-malware programs use "signatures" and "heuristics" to detect malware. A signature of a particular type of malware is the binary pattern of the malware. Anti-malware programs rely on signatures to detect and identify specific malware. Stored signatures must be kept up-to-date in order for anti-malware programs to remain effective as malware evolves over time.

The reliance of anti-malware programs on heuristics involves detecting behaviors that indicate the presence of malware. The behavior could be based on code that is running or on code patterns in files.

Thus, as described above, an anti-malware program contains data for malware signature and heuristics analysis. The anti-malware program also contains data for remediating detected malware. The anti-malware program is deployed onto a computer system by distributing, either via local installation or network transfer, all the data forming the anti-malware program to the computer system.

As the amount of malware continues to grow both in terms of number and types, the amount of data needed for an effective anti-malware program will commensurately increase. Thus, it would be beneficial, at least in part, to reduce the amount of anti-malware data needed to be distributed to a computer system without sacrificing effectiveness of the anti-malware program.

SUMMARY

According to at least one aspect of one or more embodiments of the present invention, a computer-implemented method of protecting a computer system against malware includes initially determining whether detected file activity on a local computer system represents existence of a malware instance. Dependent on whether the malware instance exists, the method includes querying a network resource for anti-malware data needed to at least one of identify and remediate the malware instance. The method further includes remediating the malware instance using the anti-malware data.

According to at least one other aspect of one or more embodiments of the present invention, a system for protecting a computer system against malware includes a malware detection module arranged to detect whether file activity represents existence of a malware instance. The system also includes a communication module arranged to query a network resource in response to detection of the malware instance, where the query is for anti-malware data needed to at least one of identify and remediate the malware instance. The system further includes a remediation module arranged to remediate the malware instance using the anti-malware data.

According to at least one other aspect of one or more embodiments of the present invention, a computer-readable medium has instructions stored therein to: detect file activity on a local computer system; determine whether the file activity represents existence of a malware instance; dependent on the determination, query a network resource for anti-malware data needed to at least one of identify and remediate the malware instance; and remediate the malware instance using the anti-malware data.

According to at least one other aspect of one or more embodiments of the present invention, a system for handling malware in a computing environment includes a local computer system having security software arranged to detect a malware instance. The system further includes a remote network resource having anti-malware data usable to at least one of identify and remediate the malware instance. The local computer system is arranged to query the remote network resource for the anti-malware data if similar data is not included in the security software.

According to at least one other aspect of one or more embodiments of the present invention, a computer-implemented method of providing anti-malware data includes distributing a first portion of a full set of anti-malware data to a client computer system. The method further includes receiving a request from the client computer system, where the request contains information about a malware instance detected by the client computer system, and where the request is sent in response to the first portion of the anti-malware data not being usable to reliably clean the malware instance. The method also includes sending a second portion of the full set of the anti-malware data to the client computer system, wherein the second portion of the anti-malware data is usable by the client computer system to reliably clean the malware instance.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to a technique for distributing anti-malware data. More particularly, data needed for effective malware protection on a local computer system may be distributed across the local computer system and one or more network resources.

Figure 1:
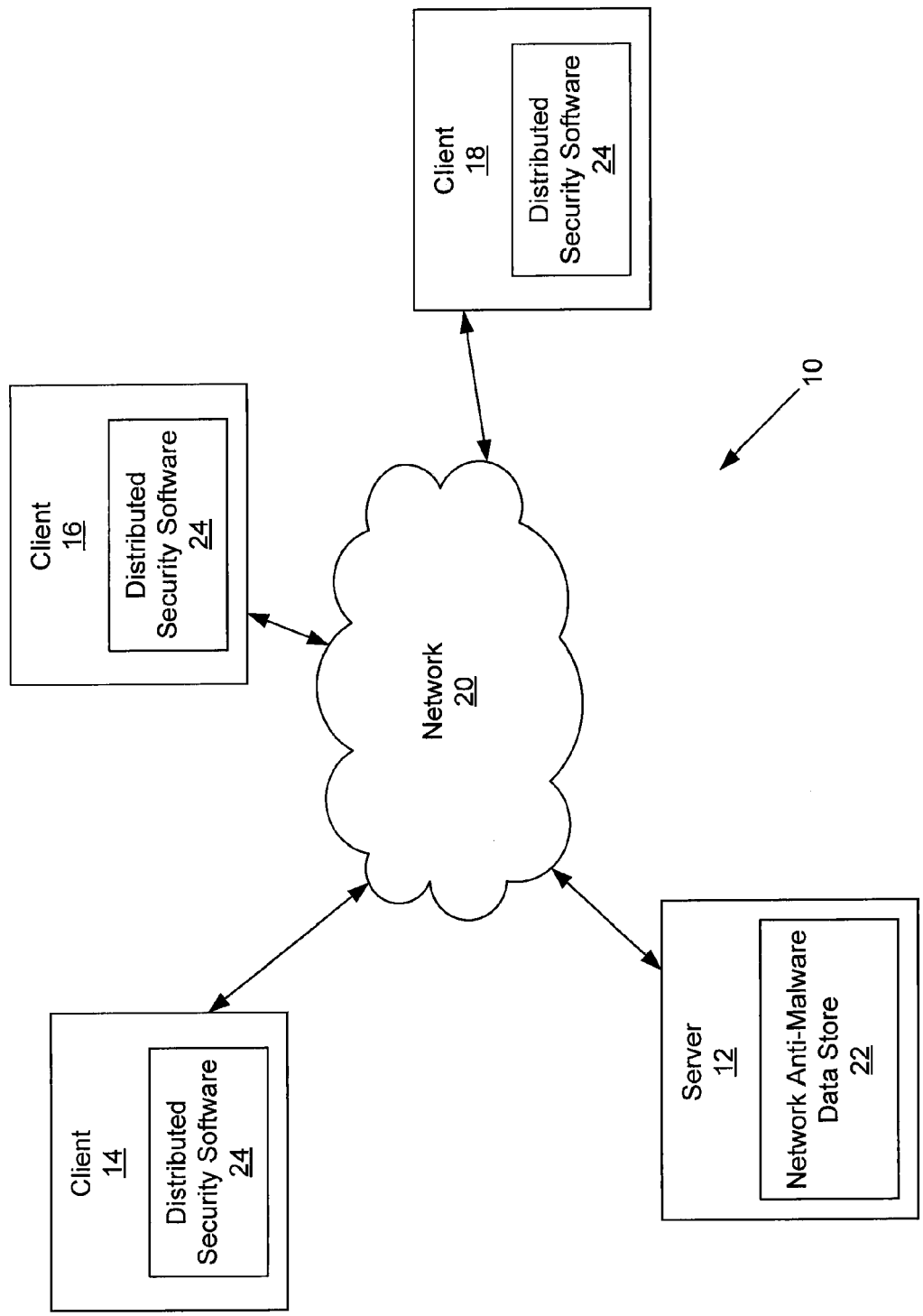
FIG. 1 shows a computing environment in accordance with an embodiment of the present invention.

FIG. 1 shows a computing environment 10 in accordance with an embodiment of the present invention. The computing environment 10 includes a "server" system 12 and a plurality of "client" (or "local") systems 14, 16, 18 connected over a network 20. The network 20 may be a local area network (LAN) (e.g., an enterprise network) or a wide area network (WAN) (e.g., the Internet). Further, the network 20 may be formed of links using technologies such as Ethernet, 802.11 (wireless interface), an integrated services digital network (ISDN), a digital subscriber line (DSL), and/or an asynchronous transfer mode (ATM). Further, networking protocols used on the network 20 may include multiprotocol label switching (MPLS), a transmission control protocol/Internet protocol (TCP/IP), a User Datagram Protocol (UDP), a hypertext transport protocol (HTTP), a simple mail transfer protocol (SMTP), and/or a file transfer protocol (FTP). Data exchanged over the network 20 may be represented using technologies and/or formats such as a hypertext markup language (HTML), an extensible markup language (XML), and/or a simple object access protocol (SOAP). Moreover, some or all of the links across the network 20 may be encrypted using encryption technologies such as a secure sockets layer (SSL), a secure hypertext transport protocol (HTTPS), and/or a virtual private network (VPN). In one or more embodiments, communication over the network 20 may be based on custom and/or dedicated means instead of, or in combination with, the technologies described above.

In general, the server 12 services, over the network 20, requests from the clients 14, 16, 18. The server 12 is shown as having or being connected to a network anti-malware data store 22. The network anti-malware data store 22 contains data that can be used to, for example, detect, identify, name, describe, and/or remediate malware.

Further, although FIG. 1 shows a single server 12, one or more other embodiments may involve any number of server systems. In such embodiments, the anti-malware data across each server may be redundant and/or complementary.

The clients 14, 16, 18 represent the plurality of clients that might be connected to the network 20. In one or more embodiments, one or more of the clients 14, 16, 18 may be personal computers (e.g., laptops, desktops) having an operating system platform using Windows® by Microsoft Corporation, MacOS by Apple Computer, Inc., Linux, and/or UNIX. Further, in one or more embodiments, one or more of the clients 14, 16, 18 may be other network-enabled electronic devices such as cellular telephones, personal digital assistants (PDAs), or portable e-mail devices.

Still referring to FIG. 1, each of the clients 14, 16, 18 is shown as having distributed security software 24. As is further described below with reference to FIGS. 2 and 3, distributed security software 24 provides anti-malware functionality for protecting the respective clients 14, 16, 18 against malware instances. In one or more embodiments, all the data needed for anti-malware functionality that would otherwise be present in typical anti-malware program installed on the client 14, 16, 18 is not present in distributed security software 24. Instead, at least a portion of the anti-malware data needed for effective anti-malware protection is stored in the network anti-malware data store 22 connected to or part of the server 12.

Figure 2:
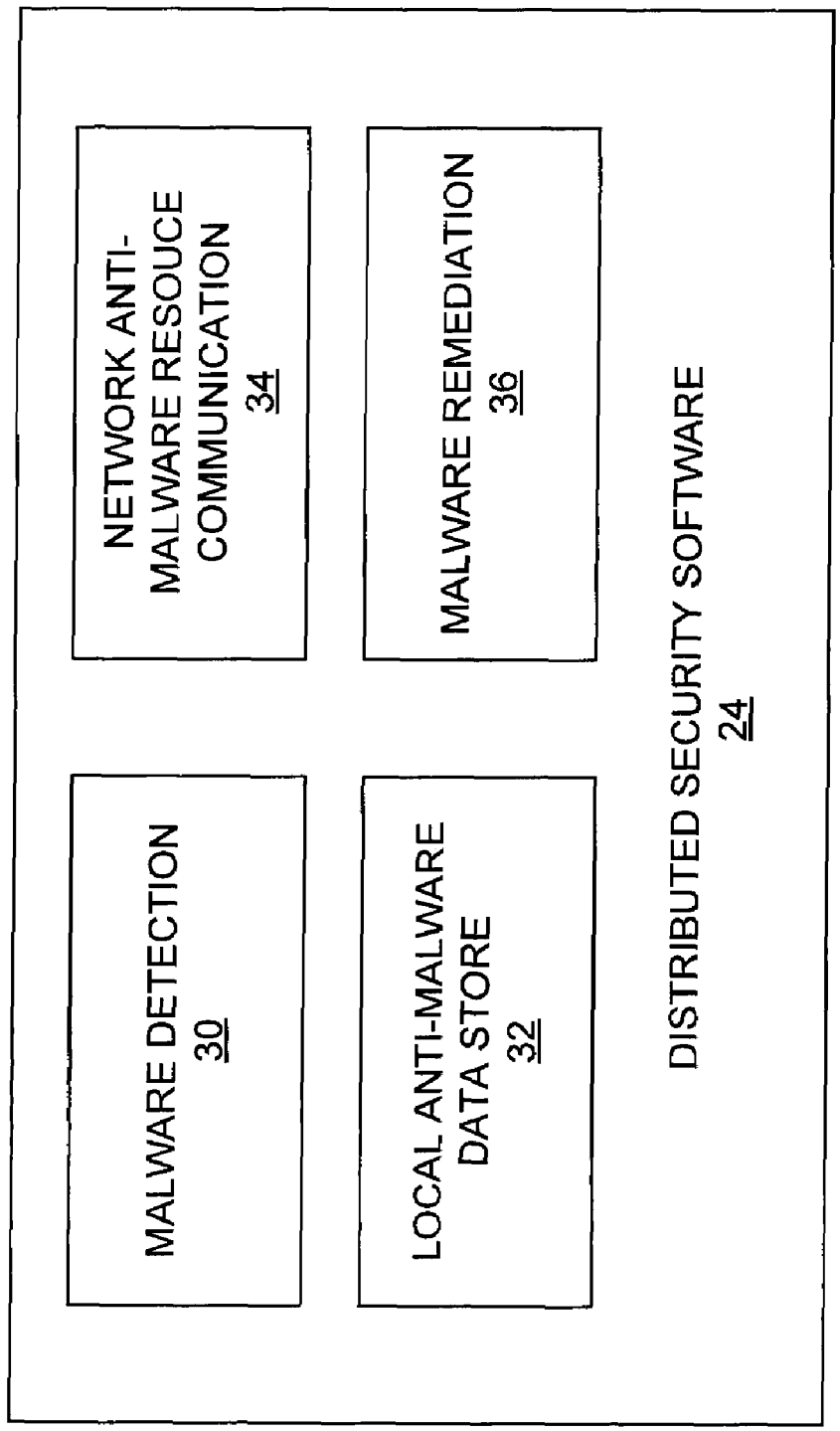
FIG. 2 shows distributed security software in accordance with an embodiment of the present invention.

FIG. 2 shows distributed security software 24 in accordance with an embodiment of the present invention. As shown in FIG. 2, distributed security software 24 has a plurality of modules, where a "module" is defined as any program, logic, and/or functionality implemented in hardware and/or software.

Distributed security software 24 includes a malware detection module 30. When a computer file is received or when a computer file attempts to execute or access particular data, the malware detection module 30 attempts to determine whether the computer file is "dirty", i.e., exhibits a malware characteristic. Such detection may be made by any one or more of a number of different ways. For example, in one or more embodiments, the malware detection module 30 monitors for heuristics—the behavior of the computer file—that indicate the presence of malware.

Further, the malware detection module 30 may perform a checksum operation of the computer file. If the result of the checksum operation is not recognized as being associated with a valid file, the malware detection module 30 may then deem the computer file as being malware.

Further still, the malware detection module 30 may contain some amount of signature data of known malware. In such a case, the malware detection module 30 may check the computer file against locally present signature data.

Further still, in one or more embodiments, the malware detection module 30 may check whether the computer file contains a particular text or character string known to be present in one or more types of malware. If such a string is found, the malware detection module 30 may determine the computer file to be malware.

Still referring to FIG. 2, distributed security software 24 has a local anti-malware data store 32. When the malware detection module 30 detects that the computer file is or likely is malware, a query may be made to determine whether the local anti-malware data store 32 contains the data necessary to reliably identify, describe, and remediate the malware. As described above, in one or more embodiments, all the data needed for anti-malware functionality that would otherwise be present in typical anti-malware program installed on a local machine is not present in the local anti-malware data store 32.

Distributed security software 24 also includes a network anti-malware resource communication module 34. In the case that the data needed to reliably clean the malware instance is not available in the local anti-malware data store 32, the network anti-malware resource communication module 34 queries a network resource (e.g., network anti-malware data store 22 shown in FIG. 1) for anti-malware data needed to identify, describe, and/or remediate the malware instance. The query to the network resource may include data about the malware instance as determined or calculated by the local machine. For example, if the malware instance is detected via a checksum operation, the result of that checksum operation may be part of the query to the network resource. In another example, if malware is detected based on heuristics, then heuristics data may be included as part of or with the query to the network resource. In still another example, if malware is detected based on detection of a malware-indicating character string, that particular character string may be indicated in the query.

Once the data needed to effectively clean a malware instance is obtained either from the local anti-malware data store 32 or as received via the network anti-malware resource communication module 34, distributed security software 24 relies on a malware remediation module 36 to remediate the malware instance.

Further, in one or more embodiments, in the case that the malware remediation module 36 remediates malware using data received via the network anti-malware resource communication module 34, that data may then be stored in the local anti-malware data store 32. In one or more other embodiments, if a particular malware instance has been remediated some threshold number of times using data from the network anti-malware resource communication module 34, that data may then be stored in the local anti-malware data store 32 so as to prevent future network queries when that malware instance is detected.

In general, the data contained in the local anti-malware data store 32 may be selectively deployed. For example, in one or more embodiments, it may be determined that a particular one or group of malware is more likely to attack than other types of malware. Thus, in this case, the data needed to reliably identify, describe, and remediate this malware may be stored in the local anti-malware data store 32 as opposed to not being fully stored on the local machine.

Further, in one or more embodiments, it may be determined that a particular type of malware compromises network connectivity. In this case, anti-malware data for protecting against this type of malware may be stored locally in the local anti-malware data store 32 so as not to require the local machine to have to obtain the necessary anti-malware data over the potentially compromised network.

Further, in one or more embodiments, a particular organization or enterprise may determine that it wants to be more robustly protected against a certain form of malware relative to others. In this case, the anti-malware data for protecting against the certain form of malware may be "pushed down" to the local machines so as not to require the local machines to have to access the network for the necessary anti-malware data.

Figure 3:
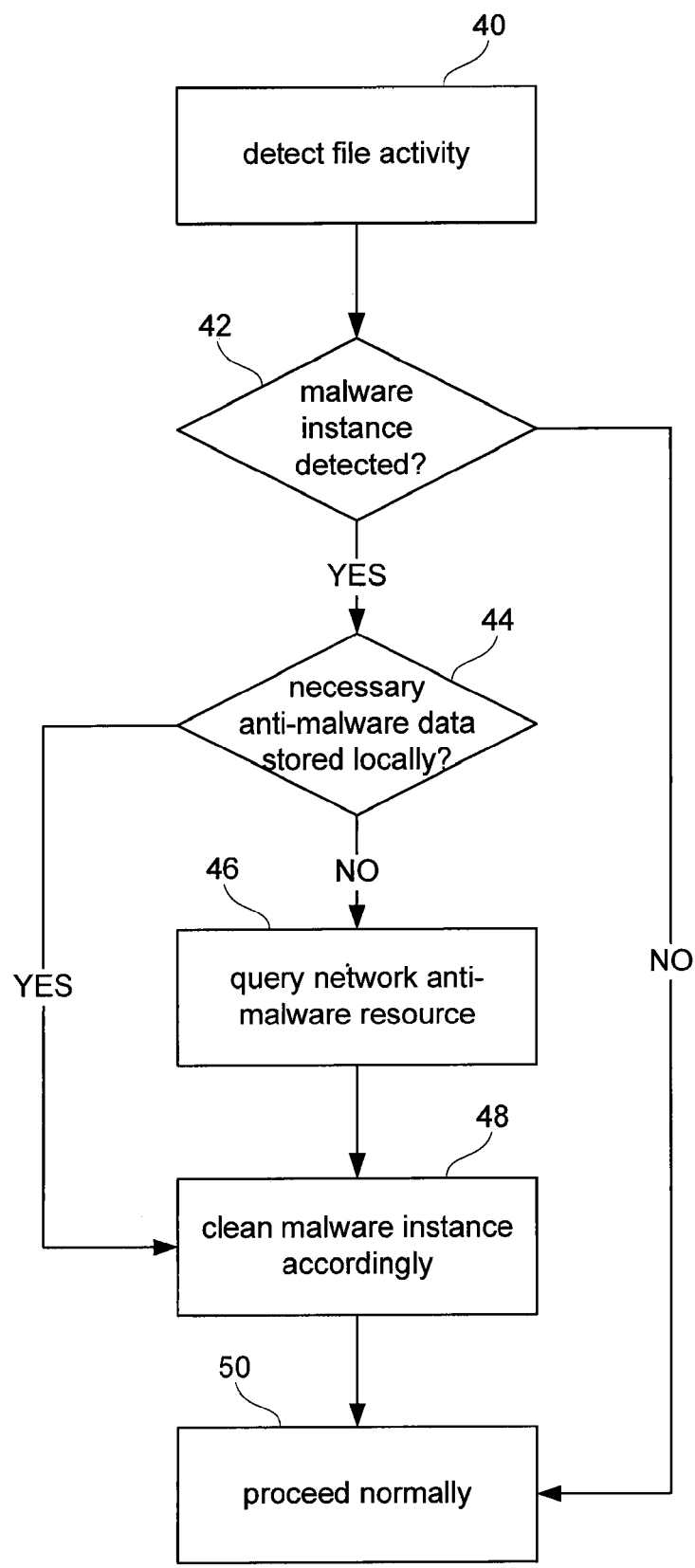
FIG. 3 shows a flow process in accordance with an embodiment of the present invention.

FIG. 3 shows a flow process in accordance with an embodiment of the present invention. The process begins by detecting file activity 40. Such file activity may include, for example, receiving a file from a network, an attempt to execute a file, and/or an attempt to access particular data. If a malware instance is not detected 42, the activity is allowed and the system proceeds normally 50.

If a malware instance is detected 42, a determination is made 44 as to whether the data necessary to reliably clean the malware instance is stored in an anti-malware data store of the local machine. If the necessary data is locally present, the malware instance is cleaned 48 using the anti-malware data locally stored.

In the case that the data necessary to reliably clean the malware instance is not locally stored, the local machine queries a network resource (e.g., network anti-malware data store 22) 46 for the anti-malware data necessary to clean the malware instance. Once this data is obtained from the network resource, the malware instance is accordingly cleaned 48.

Figure 4:
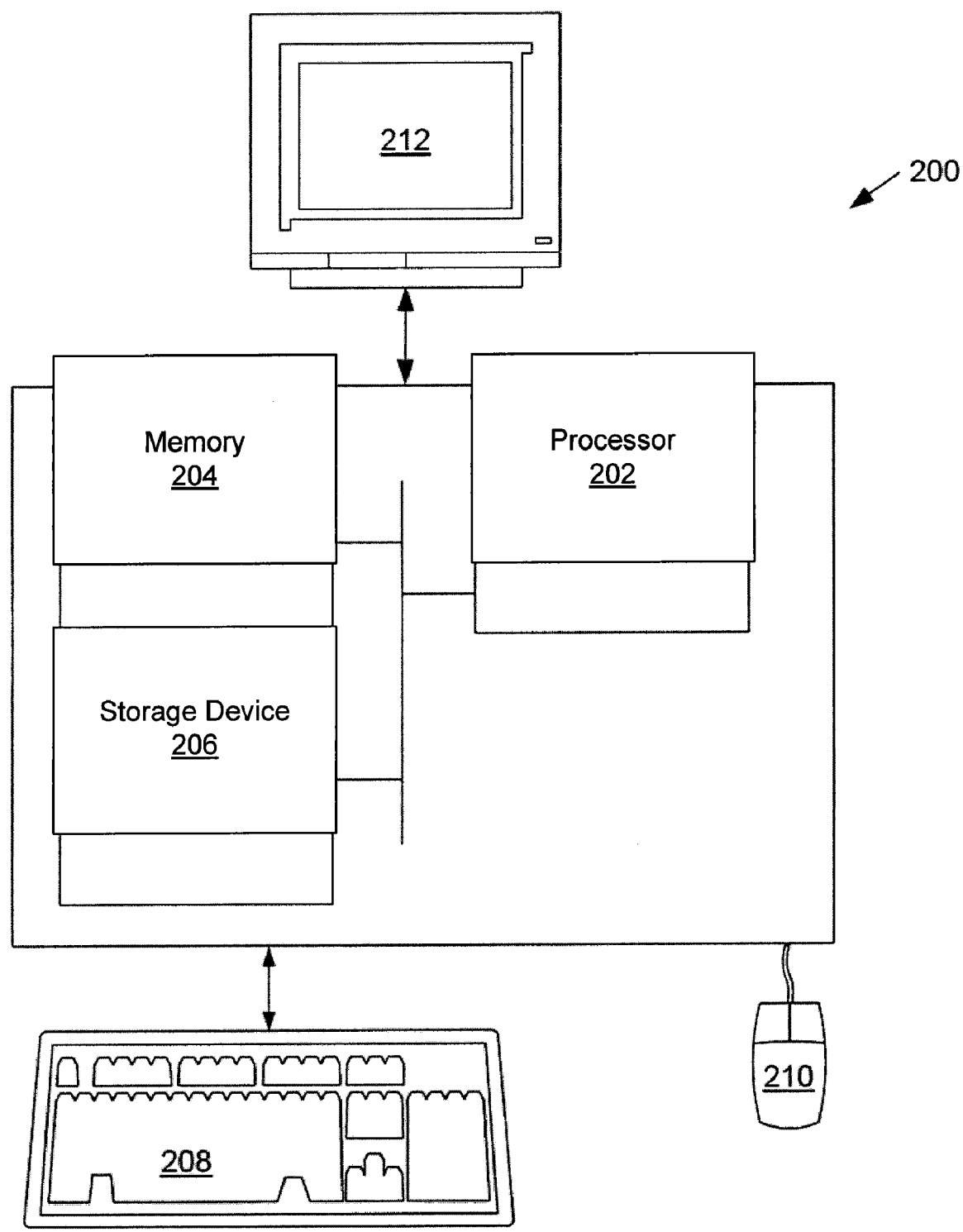
FIG. 4 shows a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 4, a networked computer system 200 (e.g., any of systems 12, 14, 16, or 18) includes at least one processor (e.g., a general-purpose processor, a field-programmable gate array (FPGA), an application-specific integrated circuit (ASIC), a graphics processor) 202, associated memory (e.g., random access memory (RAM), read-only memory (ROM)) 204, a storage device (e.g., a hard drive, an optical drive) 206, and numerous other elements (not shown) and functionalities typical of modern computer systems. The networked computer system 200 may also include input means (e.g., a keyboard 208, a mouse 210) and output means (e.g., a monitor 212). The networked computer system 200 may be connected to a LAN or a WAN via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform one or more embodiments of the present invention may be stored on a computer-readable medium such as a compact disc (CD), digital video disc (DVD), a diskette, a tape, a file, a universal serial bus (USB) "memory stick", or any other computer-readable storage device.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A computer-implemented method of protecting a computer system against malware, comprising:
   detecting file activity on a local computer system;
   determining whether the file activity represents existence of a malware instance;
   dependent on the determination, querying a local anti-malware data store on the local computer system for anti-malware data for remediating the malware instance;
   responsive to determining that the local anti-malware data store does not contain the anti-malware data, querying a network resource for the anti-malware data;
   remediating the malware instance using anti-malware data received from the network resource;
   determining whether the malware instance has been remediated a threshold number of times using the anti-malware data received from the network resource;
   responsive to the malware instance having been remediated at least the threshold number of times, storing the anti-malware data received from the network resource in the local anti-malware data store; and
   responsive to the malware instance having not been remediated the threshold number of times, discarding the anti-malware data received from the network resource.

2. The computer-implemented method of claim 1, wherein the detection of file activity comprises at least one of:
   detecting introduction of a computer file to the local computer system;
   detecting that a computer file is attempting to execute on the local computer system; and
   detecting that a computer file is attempting to access data on the local computer system.

3. The computer-implemented method of claim 1, wherein the determination of whether the file activity represents existence of a malware instance comprises:
   performing a checksum operation on a computer file; and determining a result of the checksum operation to be invalid.

4. The computer-implemented method of claim 1, wherein the determination of whether the file activity represents existence of a malware instance comprises:
monitoring heuristics associated with the file activity.

5. The computer-implemented method of claim 1, wherein the determination of whether the file activity represents existence of a malware instance comprises:
detecting a malware-indicating character string in a computer file associated with the file activity.

6. The computer-implemented method of claim 1, wherein the local anti-malware data store stores anti-malware data for remediating malware known to compromise network connectivity and the network resource stores anti-malware data for remediating malware not known to compromise network connectivity.

7. The computer-implemented method of claim 1, wherein the local anti-malware data store stores anti-malware data for remediating malware known to be likely to attack the local computer system and the network resource stores anti-malware data for remediating malware not known to be likely to attack the local computer system.

8. A system for protecting a computer system against malware, comprising:
a malware detection module arranged to
detect whether file activity represents existence of a malware instance; and
query a local anti-malware data store in response to a detection of the malware instance for anti-malware data for remediating the malware instance;
a communication module arranged to query a network resource responsive to determining that the local anti-malware data store does not contain the anti-malware data, the query being for the anti-malware data; and
a remediation module arranged to:
remediate the malware instance using anti-malware data received from the network resource;
determine whether the malware instance has been remediated at least a threshold number of times using the anti-malware data received from the network resource;
responsive to the malware instance having been remediated at least the threshold number of times, store the anti-malware data in the local anti-malware data store; and
responsive to the malware instance having not been remediated the threshold number of times discard the anti-malware data received from the network resource.

9. The system of claim 8, wherein the malware detection module is further arranged to at least one of detect introduction of a computer file to the computer system, detect that a computer file is attempting to execute on the computer system, and detect that a computer file is attempting to access data on the computer system.

10. The system of claim 8, wherein the malware detection module is further arranged to perform a checksum operation on a computer file associated with the file activity.

11. The system of claim 8, wherein the malware detection module is further arranged to monitor heuristics associated with the file activity.

12. The system of claim 8, wherein the malware detection module is further arranged to detect a malware-indicating character string in a computer file associated with the file activity.

13. A computer-readable medium having instructions stored therein and being executable by a processor, the instructions to:
detect file activity on a local computer system;
determine whether the file activity represents existence of a malware instance;
dependent on the determination, query a local anti-malware data store on the local computer system for anti-malware data for remediating the malware instance;
responsive to determining that the local anti-malware data store does not contain the anti-malware data, query a network resource for the anti-malware data;
remediate the malware instance using anti-malware data received from the network resource;
determine whether the malware instance has been remediated a threshold number of times using the anti-malware data received from the network resource;
responsive to the malware instance having been remediated at least the threshold number of times, store the anti-malware data received from the network resource in the local anti-malware data store; and
responsive to the malware instance having not been remediated the threshold number of times, discard the anti-malware data received from the network resource.

14. The computer-readable medium of claim 13, wherein the instructions to detect file activity comprises instructions to at least one of:
detect introduction of a computer file to the local computer system;
detect that a computer file is attempting to execute on the local computer system; and
detect that a computer file is attempting to access data on the local computer system.

15. The computer-readable medium of claim 13, wherein the instructions to determine whether the file activity represents existence of a malware instance comprise instructions to:
perform a checksum operation on a computer file; and
determine a result of the checksum operation to be invalid.

16. The computer-readable medium of claim 13, wherein the instructions to determine whether the file activity represents existence of a malware instance comprise instructions to:
monitor heuristics associated with the file activity.

17. The computer-readable medium of claim 13, wherein the instructions to determine whether the file activity represents existence of a malware instance comprise instructions to:
detect a malware-indicating character string in a computer file associated with the file activity.

* * * * *